US010366834B1

(12) United States Patent
Lee et al.

(10) Patent No.: US 10,366,834 B1
(45) Date of Patent: Jul. 30, 2019

(54) CERAMIC ELECTRONIC COMPONENT

(71) Applicant: SAMSUNG ELECTRO-MECHANICS CO., LTD., Suwon-si, Gyeonggi-do (KR)

(72) Inventors: Jang Yeol Lee, Suwon-si (KR); Eui Hyun Jo, Suwon-si (KR); Myung Jun Park, Suwon-si (KR); Jong Ho Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/188,188

(22) Filed: Nov. 12, 2018

(30) Foreign Application Priority Data

Sep. 6, 2018 (KR) .................. 10-2018-0106588

(51) Int. Cl.
H01G 4/12 (2006.01)
H01G 4/30 (2006.01)
H01G 4/008 (2006.01)
H01G 4/012 (2006.01)
H01G 4/232 (2006.01)
H01G 4/248 (2006.01)

(52) U.S. Cl.
CPC ............. *H01G 4/248* (2013.01); *H01G 4/012* (2013.01); *H01G 4/1209* (2013.01); *H01G 4/2325* (2013.01); *H01G 4/30* (2013.01); *H01G 4/0085* (2013.01); *H01G 4/1227* (2013.01)

(58) Field of Classification Search
CPC ...... H01G 4/248; H01G 4/012; H01G 4/1209; H01G 4/2325; H01G 4/30; H01G 4/0085; H01G 4/1227; H01C 7/04; H01C 7/02; H01C 7/10

USPC ....................................... 361/301.4
See application file for complete search history.

(56) References Cited

U.S. PATENT DOCUMENTS 5,339,068 A * 8/1994 Tsunoda ................. H01C 1/02
338/308

FOREIGN PATENT DOCUMENTS

KR 10-0204255 B1 6/1999
KR 10-1703195 B1 2/2017

\* cited by examiner

*Primary Examiner* — Michael P McFadden
(74) *Attorney, Agent, or Firm* — Morgan Lewis & Bockius LLP

(57) ABSTRACT

A ceramic electronic component includes a body including a dielectric layer and first and second internal electrodes, a first external electrode including a first electrode layer electrically connected to the first internal electrode, a first inorganic insulating layer disposed on the first electrode layer, and a first plating layer disposed on the first inorganic insulating layer, a second external electrode including a second electrode layer electrically connected to the second internal electrode, a second inorganic insulating layer disposed on the second electrode layer, and a second plating layer disposed on the second inorganic insulating layer, and a third inorganic insulating layer disposed on the body and connected to the first and second inorganic insulating layers. The first, second and third inorganic insulating layers comprise one or more of $SiO_2$, $Al_2O_3$ and $ZrO_2$, and the first, second and third inorganic insulating layers have a thickness within a range from 20 nm to 150 nm.

16 Claims, 4 Drawing Sheets

CERAMIC ELECTRONIC COMPONENT

CROSS-REFERENCE TO RELATED APPLICATION(S)

This application claims the benefit of priority to Korean Patent Application No. 10-2018-0106588 filed on Sep. 6, 2018 in the Korean Intellectual Property Office, the disclosure of which is incorporated herein by reference in its entirety.

BACKGROUND

1. Field

The present disclosure relates to a ceramic electronic component.

2. Description of Related Art

A multilayer ceramic capacitor (MLCC) is a chip-type condenser mounted on the printed circuit substrates of a variety of electronic products such as an image display device, including liquid crystal displays (LCD) and plasma display panels (PDP), computers, smartphones, cellular phones, and the like, serving to charge and discharge electricity.

A multilayer ceramic capacitor may be used as a component of various electronic devices as it is relatively small in size and is able to secure high capacity while being easily installed. As electronic devices such as computers, mobile devices, and the like, are miniaturized and increased in power, there has been increased demand for miniaturized and high capacity multilayer ceramic capacitors.

To simultaneously achieve miniaturization and high capacity, the number of layers may need to increase by configuring thicknesses of a dielectric layer and an internal electrode to be thin. Also, to secure maximum valid capacity, thicknesses of a margin portion, a cover portion, and an external electrode may need to be reduced, which may lead to degradation of moisture resistance reliability.

SUMMARY

An aspect of the present disclosure may provide a ceramic electronic component having excellent moisture resistance reliability.

According to an aspect of the present disclosure, a ceramic electronic component includes a body including a dielectric layer and first and second internal electrodes disposed to oppose each other with the dielectric layer interposed therebetween, first and second surfaces opposing each other, third and fourth surfaces connected to the first and second surfaces and opposing each other, and fifth and sixth surfaces connected to the first to fourth surfaces and opposing each other, a first external electrode including a first electrode layer disposed on the third surface of the body and electrically connected to the first internal electrode, a first inorganic insulating layer disposed on the first electrode layer, and a first plating layer disposed on the first inorganic insulating layer, a second external electrode including a second electrode layer disposed on the fourth surface of the body and electrically connected to the second internal electrode, a second inorganic insulating layer disposed on the second electrode layer, and a second plating layer disposed on the second inorganic insulating layer, and a third inorganic insulating layer disposed on the first, second, fifth, and sixth surfaces of the body and connected to the first and second inorganic insulating layers. The first, second and third inorganic insulating layers comprise at least one selected from the group of $SiO_2$, $Al_2O_3$ and $ZrO_2$, and the first, second and third inorganic insulating layers have a thickness within a range from 20 nm to 150 nm.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
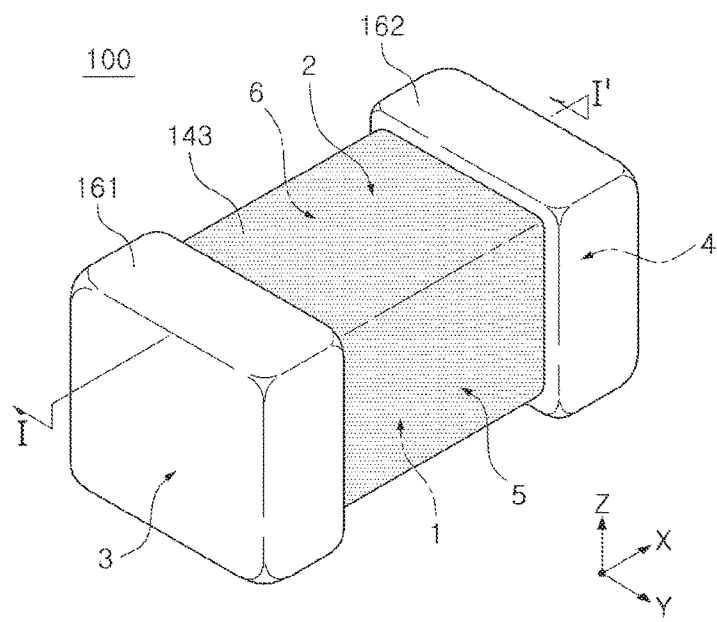
FIG. 1 is a perspective diagram illustrating a ceramic electronic component according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numeral.

In the drawings, unnecessary descriptions may be omitted to clearly describe the present disclosure, and to clearly express a plurality of layers and areas, thicknesses may be magnified. The same elements having the same function within the scope of the same concept will be described with use of the same reference numeral. Further, throughout the specification, it will be understood that when a part "includes" an element, it may further include another element, not excluding another element, unless otherwise indicated.

In the drawings, an X direction is a second direction, an L direction, or a length direction, a Y direction is a third direction, a W direction, or a width direction, a Z direction is a first direction, a layering direction, a T direction, or a thickness direction.

Ceramic Electronic Component

FIG. 1 is a perspective diagram illustrating a ceramic electronic component according to an exemplary embodiment.

Figure 2:
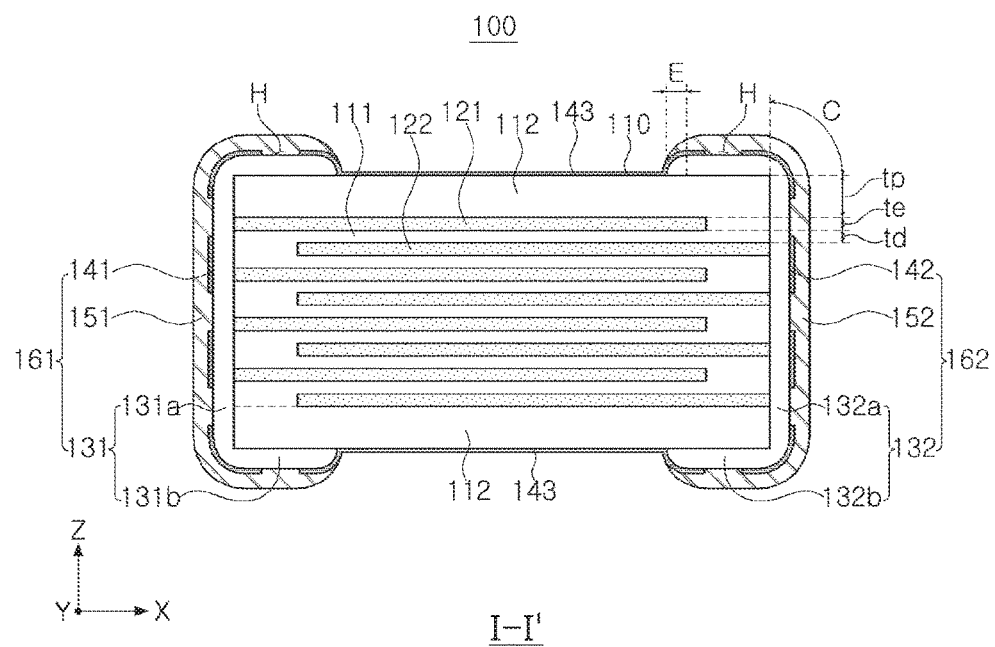
FIG. 2 is a cross-sectional diagram taken along line I-I' in FIG. 1.

FIG. 2 is a cross-sectional diagram taken along line I-I' in FIG. 1.

Figure 3A:
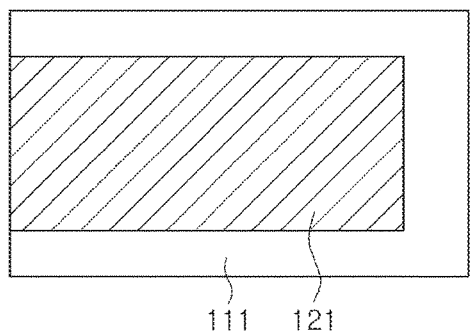
FIG. 3A is a diagram illustrating a ceramic green sheet on which a first internal electrode is printed.
Figure 3B:
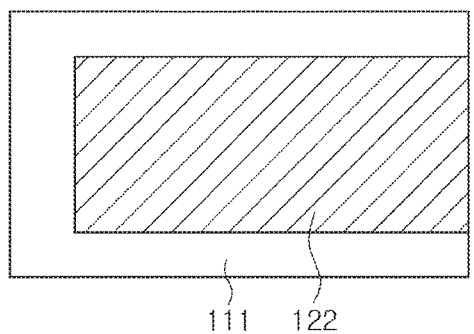
FIG. 3B is a diagram illustrating a ceramic green sheet on which a second internal electrode is printed.

FIG. 3A is a diagram illustrating a ceramic green sheet on which a first internal electrode is printed, and FIG. 3B is a diagram illustrating a ceramic green sheet on which a second internal electrode is printed.

Referring FIGS. 1 to 3B, a ceramic electronic component according to an exemplary embodiment may include a body 110 including a dielectric layer 111 and first and second internal electrodes 121 and 122 disposed to oppose each other with the dielectric layer interposed therebetween, first and second surfaces 1 and 2 opposing each other, third and fourth surfaces 3 and 4 connected to the first and second surfaces and opposing each other, and fifth and sixth surfaces 5 and 6 connected to the first to fourth surfaces and opposing each other, and a first external electrode 161 including a first electrode layer 131 disposed on the third surface of the body and electrically connected to the first internal electrode, a first inorganic insulating layer 141 disposed on the first electrode layer, and a first plating layer 151 disposed on the first inorganic insulating layer, a second external electrode 162 including a second electrode layer 132 disposed on the fourth surface of the body and electrically connected to the second internal electrode, a second inorganic insulating layer 142 disposed on the second electrode layer, and a second plating layer 152 disposed on the second inorganic insulating layer, and a third inorganic insulating layer 143 disposed on the first, second, fifth, and sixth surfaces of the body and connected to the first and second inorganic insulating layers. The first to third inorganic insulating layers may include one or more of $SiO_2$, $Al_2O_3$ and $ZrO_2$, and the first to third inorganic insulating layers may have a thickness ranging from 20 nm to 150 nm.

The dielectric layer 111 and the internal electrodes 121 and 122 may be alternately layered in the body 110.

There may be no particular limitation on a shape of the body 110, but as illustrated in the diagram, the body 110 may have a hexahedral shape or a shape similar to a hexahedron. Due to shrinkage of a ceramic powder included in the body 110 during a process of sintering, the body 110 may not be an exact hexahedron, but may have a substantially hexahedral shape.

The body 110 may have the first and second surfaces 1 and 2 opposing each other in a thickness direction (a Z direction), the third and fourth surfaces 3 and 4 connected to the first and second surfaces 1 and 2 and opposing each other in a length direction (an X direction), and the fifth and sixth surfaces 5 and 6 connected to the first and second surfaces 1 and 2 and the third and fourth surfaces 3 and 4, and opposing each other in a width direction (a Y direction).

The plurality of dielectric layers 111 forming the body 110 may be in a sintered state, and the dielectric layers 111 may be integrated, such that boundaries between adjacent dielectric layers 111 may be difficult to identify without using a scanning electron microscope (SEM).

A material forming the dielectric layer 111 may not be particularly limited as long as sufficient capacitance is able to be obtained. For example, the material of the dielectric layer 111 may be a barium titanate ($BaTiO_3$) power. As the material composing the dielectric layer 111, various ceramic additives, organic solvents, coupling agents, dispersing agents, and the like, may be added in addition to barium titanate ($BaTiO_3$) powder, or the like, depending on an intended purpose.

A thickness of the dielectric layer 111 may not be particularly limited.

However, if the dielectric layer 111 is configured to have a thickness lower than 0.6 μm, particularly, if a thickness of the dielectric layer 111 is configured to be 0.4 μm or less, moisture resistance reliability may be degraded.

As described in the description below, in the case in which thicknesses of the first to third inorganic insulating layers are configured to be within a range of 20 nm to 150 nm, moisture resistance reliability of the ceramic electronic component may improve. Accordingly, even when a thickness of the dielectric layer is 0.4 μm or less, sufficient moisture resistance reliability may be secured.

Thus, even in the case in which a thickness of the dielectric layer is 0.4 μm or less, a moisture resistance reliability effect according to the example may become more prominent.

A thickness of the dielectric layer 111 may refer to an average thickness of the dielectric layers 111 interposed between the first and second internal electrodes 121 and 122.

The average thickness of the dielectric layers 111 may be obtained by scanning a cross-section of the body 110 taken in a length and thickness direction (an L-T direction) using an SEM.

For example, a random image of the dielectric layer may be extracted from a scanned image of a cross-section taken in a length and thickness direction (an L-T direction), created by cutting a central portion of the body 110 in a width direction, using an SEM, and an average of thicknesses of 30 points at equal intervals, measured in a length direction, may be calculated.

The 30 points with equal intervals may be measured in a capacitance forming portion which refers to an area of overlap between the first and second internal electrodes 121 and 122.

In this case, the ceramic electronic component 100 according to the example may include the capacitance forming portion configured to form capacitance including the first and second internal electrodes disposed in the body 110 and opposing each other with the dielectric layer interposed therebetween, and a cover portion 112 configured to be formed in upper and lower portions of the capacitance forming portion.

The cover portion 112 may not include an internal electrode, and may include the same material as the material of the dielectric layer 111. In other words, the cover portion 112 may include a ceramic material, such as a barium titanate ($BaTiO_3$) ceramic material, for example.

The cover portion 112 may be formed by layering a single dielectric layer or two or more dielectric layers on upper and lower surfaces of the capacitance forming portion in upper and lower directions, respectively, and may serve to prevent damage to an internal electrode caused by physical or chemical stress.

A thickness of the cover portion 112 may not be particularly limited. However, to achieve miniaturization and high capacitance of the ceramic electronic component, a thickness tp of the cover portion 112 may be 20 μm or less, but in this case, moisture resistance reliability may degrade as a moisture penetration route is reduced.

As described below, according to the example, in the case in which thicknesses of the first to third inorganic insulating layers are configured to be within a range of 20 nm to 150 nm, moisture resistance reliability of the ceramic electronic component may improve. Accordingly, even when a thickness of the cover portion 112 is 20 μm or less, sufficient moisture resistance reliability may be secured.

Accordingly, even in the case in which a thickness tp of the cover portion 112 is 20 μm or less, a moisture resistance reliability effect may become more prominent according to the example.

The internal electrodes 121 and 122 may be alternately layered with the dielectric layer, and may include the first and second internal electrodes 121 and 122. The first and second internal electrodes 121 and 122 may be alternately disposed to oppose each other with the dielectric layer interposed therebetween, and may be exposed to the third and fourth surfaces 3 and 4 of the body 110, respectively.

Referring to FIG. 2, the first internal electrode 121 may be spaced apart from the fourth surface 4, and may be exposed through the third surface 3. The second internal electrode 122 may be spaced apart from the third surface 3, and may be exposed through the fourth surface 4.

In this case, the first and second internal electrodes 121 and 122 may be electrically separated from each other by the dielectric layer 111 interposed therebetween. Referring to FIG. 3, the body 110 may be formed by alternately layering a ceramic green sheet a on which the first internal electrode 121 is printed and a ceramic green sheet b on which the second internal electrode 122 is printed, and being sintered.

A material forming the first and second internal electrodes 121 and 122 may not be particularly limited, and may be formed of a conductive paste comprised of more than one material among noble metals such as palladium (Pd), a palladium-silver (Pd—Ag) alloy, and the like, and nickel (Ni) and copper (Cu), for example.

As the method of printing a conductive paste, a screen printing method, a gravure printing method, or the like, may be used, but the method of printing is not limited thereto.

Thicknesses of the first and second internal electrodes 121 and 122 may not be particularly limited. However, to achieve miniaturization and high capacitance of the ceramic electronic component, the thicknesses to of the first and second internal electrodes 121 and 122 may be 0.4 μm or less.

The thicknesses of the first and second internal electrodes 121 and 122 may refer to an average thickness of the first and second internal electrodes 121 and 122.

An average thickness of the first and second internal electrodes 121 and 122 may be obtained by scanning a cross-section of the body 110 taken in a length and thickness direction (an L-T direction) using an SEM.

For example, a random image of the first and second internal electrodes 121 and 122 may be extracted from a scanned image of a cross-section taken in a length and thickness direction (an L-T direction), created by cutting a central portion of the body 110 in a width direction, using an SEM, and an average of thicknesses of 30 points at equal intervals, measured in a length direction, may be calculated.

The 30 points with equal intervals may be measured in a capacitance forming portion which refer to an area of overlap between the first and second internal electrodes 121 and 122.

The external electrodes 161 and 162 may be disposed in the body 110, and may include the electrode layers 131 and 132, the inorganic insulating layers 141 and 142, and the plating layers 151 and 152. The external electrodes 161 and 162 may include the first and second external electrode 161 and 162 connected to the first and second internal electrodes 121 and 122, respectively.

The first electrode layer 131 may include a first connection portion 131a disposed on the third surface 3 of the body, and a first band portion 131b extended from the first connection portion 131a to portions of the first, second, fifth, and sixes surfaces 1, 2, 5 and 6.

The second electrode layer 132 may include a second connection portion 132a disposed on the fourth surface 4 of the body, and a second band portion 132b extended from the second connection portion 132a to portions of the first, second, fifth, and sixes surfaces 1, 2, 5 and 6.

Meanwhile, the first and second electrode layers 131 and 132 may be formed of any material having electrical conductivity such as a metal, and a specific material thereof may be determined by considering electrical properties, structural stability, and the like.

For example, the first and second electrode layers 131 and 132 may be a sintered electrode including a conductive metal and glass, or may be a resin electrode including a conductive metal and a base resin.

Also, the first and second electrode layers 131 and 132 may be formed using an atomic layer deposition (ALD) process, a molecular layer deposition (MLD) process, a chemical vapor deposition (CVD) process, a sputtering process, or the like.

However, in the case in which the first and second electrode layers 131 and 132 are sintered electrodes including a conductive metal and glass, a thickness of a corner portion at which the connection portions 131a and 132a and the band portions 131b and 132b meet may be reduced, or an air gap may be created between the body 110 and ends E of the band portions 131b and 132b. Accordingly, moisture resistance reliability may degrade.

Thus, in the case in which the first and second electrode layers 131 and 132 include a conductive metal and glass, the improvement of moisture resistance reliability according to the example may become more effective.

Thicknesses of the first and second electrode layers 131 and 132 may not be particularly limited, and may be within a range of 1 to 10 μm, for example.

The first and second inorganic insulating layers 141 and 142 may be disposed on the first and second electrode layers 131 and 132, respectively.

The third inorganic layer 143 may be disposed on the first, second, fifth, and sixth surfaces 1, 2, 5 and 6 of the body 110 and connected to the first and second inorganic insulating layers 141 and 142.

The inorganic insulating layers 141, 142 and 143 may improve moisture resistance reliability by blocking a moisture penetration route.

The first and second inorganic insulating layers 141 and 142 may prevent moisture from penetrating into the body through the external electrodes 161 and 162.

The third inorganic insulating layer 143 may prevent moisture from penetrating into the body through an external surface of the body by sealing fine pores or cracks in the body 110.

Also, the first and second inorganic insulating layers 141 and 142 and the third inorganic insulating layer 143 may be connected to each other and become a single inorganic insulating layer 141, 142 and 143, and may block a moisture penetration route caused by an air gap created between the body 110 and ends of the band portions 131b and 132b, thereby improving moisture resistance reliability.

The first to third inorganic insulating layers 141, 142 and 143 may include one or more of $SiO_2$, $Al_2O_3$ and $ZrO_2$, and the first to third inorganic insulating layers may have a thickness within a range from 20 nm to 150 nm.

The inorganic insulating layers including one or more of $SiO_2$, $Al_2O_3$ and $ZrO_2$ may have a significantly low water vapor transmission rate, as compared to coating materials for securing moisture resistance reliability used in the related art, such as a silicone resin, a fluorinated water repellent agent, and the like, and may have excellent bonding strength with the electrode layers 131 and 132. Also, there may be no need to additionally change conditions in relation to a process of forming an electrode layer and a plating process, and thus, overall processes except for a process of forming an inorganic insulating layer may not be significantly different from the processes used in the related art, which may be an advantage in terms of infrastructure.

In the case in which the first to third inorganic insulating layers 141, 142 and 143 do not include one or more of $SiO_2$, $Al_2O_3$ and $ZrO_2$, it may be difficult to secure sufficient moisture resistance reliability.

In the case in which thicknesses of the first to third inorganic insulating layers 141, 142 and 143 are less than 20 nm, it may be difficult to secure sufficient moisture resistance reliability, and in the case in which the thicknesses are greater than 150 nm, there may be discontinuation of the plating layer.

Table 1 below indicates results of examining a moisture load of 40 samples of a thickness of the first to third inorganic insulating layers 141, 142 and 143 after forming the thicknesses as in Table 1 using $Al_2O_3$.

In the moisture load examination, 1.5 times reference voltage was applied for 12 hours in conditions of temperature 85° C. and relative humidity 85%, and after examination, samples in which an insulating resistance value is degraded by 1-order or more as compared to the value before the examination started was determined as defects.

TABLE 1

| Sample Number | Thickness of Inorganic Insulating Layer (nm) | Number of Moisture Load Defect | Frequency of Defect |
|---|---|---|---|
| 1 | 5 | 20/40 | 50% |
| 2 | 15 | 1/40 | 2.5% |
| 3 | 20 | 0/40 | 0% |
| 4 | 50 | 0/40 | 0% |
| 5 | 100 | 0/40 | 0% |
| 6 | 200 | 0/40 | 0% |

As indicated in Table 1 above, in the case of samples 1 and 2 in which thicknesses of the first to third inorganic insulating layers 141, 142 and 143 were less than 20 nm, sufficient moisture resistance reliability was not secured as moisture load defects occurred.

However, in the case of samples 3 to 6 in which thicknesses of the first to third inorganic insulating layers 141, 142 and 143 were 20 nm or greater, sufficient moisture resistance reliability was secured as moisture load defects did not occur.

Table 2 below indicates results of measuring the number of Ni plating discontinuation defects after forming thicknesses of the first to third inorganic insulating layers 141, 142 and 143 as in Table 1 below using $Al_2O_3$ and performing an Ni electroplating process on 100 samples.

TABLE 2

| Sample Number | Thickness of Inorganic Insulating Layer (nm) | Number of Ni plating Discontinuation Defect | Frequency of Defect |
|---|---|---|---|
| 7 | 20 | 0/100 | 0% |
| 8 | 50 | 0/100 | 0% |
| 9 | 92 | 0/100 | 0% |
| 10 | 105 | 0/100 | 0% |

TABLE 2-continued

| Sample Number | Thickness of Inorganic Insulating Layer (nm) | Number of Ni plating Discontinuation Defect | Frequency of Defect |
|---|---|---|---|
| 11 | 151 | 15/100 | 15% |
| 12 | 240 | 100/100 | 100% |

As indicated in Table 2, in the case of samples 11 and 12 in which thicknesses of the first to third inorganic insulating layers 141, 142 and 143 exceed 150 nm, Ni plating discontinuation occurred.

However, in the case of samples 7 to 10 in which thicknesses of the first to third inorganic insulating layers 141, 142 and 143 were 150 nm or less, Ni plating discontinuation did not occur.

Table 3 below indicates results of measuring water vapor transmission rates of samples 3 to 6 in Table 1 above in conditions of temperature 85° C. and relative humidity 85%.

TABLE 3

| Sample Number | Thickness of Inorganic Insulating Layer (nm) | Water Vapor Transmission Rate [mg/(m$^2$ * day)] |
|---|---|---|
| 3 | 20 | 4.85 |
| 4 | 50 | 2.4 |
| 5 | 100 | 1.1 |
| 6 | 200 | 0.3 |

As indicated in Tables 1 and 3, to secure sufficient moisture resistance reliability, a water vapor transmission rate of the first to third inorganic insulating layers 141, 142 and 143 may be 5 mg/(m$^2$*day) or less.

The method for forming the inorganic insulating layers may not be particularly limited. For example, the inorganic insulating layers may be formed by an atomic layer deposition (ALD) process, a molecular layer deposition (MLD) process, a chemical vapor deposition (CVD) process, and the like.

Figure 4:
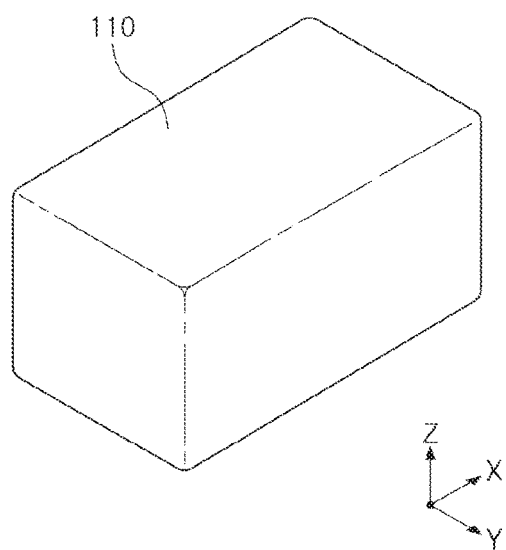
FIG. 4 is a perspective diagram illustrating a body manufactured by layering ceramic green sheets in FIGS. 3A and 3B.
Figure 5:
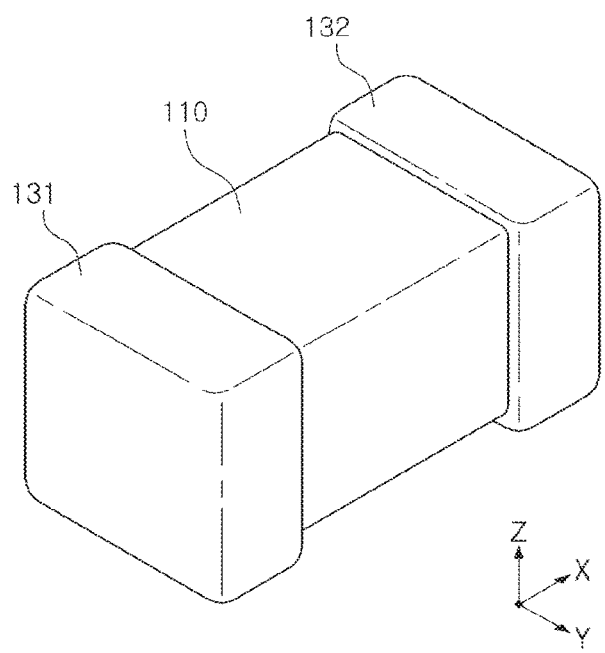
FIG. 5 is a perspective diagram illustrating a configuration in which a first electrode layer is formed on a body in FIG. 4.
Figure 6:
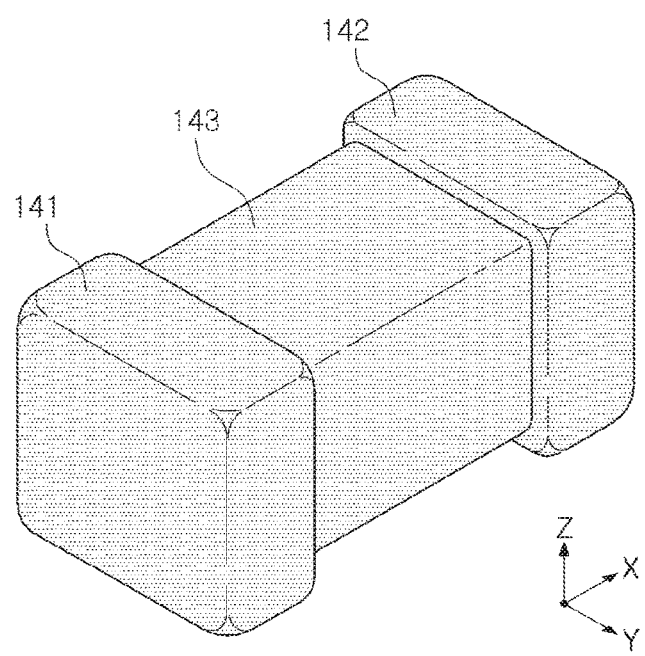
FIG. 6 is a perspective diagram illustrating a configuration in which an inorganic insulating layer is formed on a body on which a first electrode layer is formed in FIG. 5.

FIG. 4 is a perspective diagram illustrating a body manufactured by layering ceramic green sheets in FIG. 3. FIG. 5 is a perspective diagram illustrating a configuration in which a first electrode layer is formed on a body in FIG. 4. FIG. 6 is a perspective diagram illustrating a configuration in which an inorganic insulating layer is formed on a body on which a first electrode layer is formed in FIG. 5.

Referring to FIGS. 3A to 6, a body 110 may be manufactured by layering ceramic green sheets, and first and second electrode layers 131 and 132 may be formed on the body 110. Then, inorganic insulating layers 141, 142 and 143 may be formed on an overall area of an external surface of the body on which the first and second electrode layers 131 and 132 are formed. Thereafter, to improve electrical connectivity, a process of forming an opening H in the first and second inorganic insulating layers may be added as described below.

Thereafter, first and second plating layers 151 and 152 may be formed on the first and second inorganic insulating layers 141 and 142, respectively, and a capacitor according to the exemplary embodiment in FIG. 1 may be manufactured.

Meanwhile, the opening H may be formed on the first and second inorganic insulating layers 141 and 142, and the first and second plating layers 151 and 152 may be in direct contact with the first and second electrode layers 131 and 132 through the opening, respectively.

The opening H may be formed by, after forming the first and second electrode layers 131 and 132 on the body including internal electrodes, forming inorganic insulating layers having a low water vapor transmission rate on an overall area of an external surface and partially removing portions of the inorganic insulating layers 141 and 142 formed on the first and second electrode layers 131 and 132.

As the method of removing an area in which the opening H is formed, a laser process, a mechanical polishing process, a dry etching process, a wet etching process, a shadowing deposition method using a tape protective layer, and the like, may be used.

The opening H may not be formed on ends E of first and second band portions 131*b* and 132*b*, and a corner portion C at which the first and second band portions 131*b* and 132*b* meet first and second connection portions 131*a* and 132*a*, respectively. Hence, the first and second electrode layers 131 and 132 may cover ends of the first and second band portions 131*b* and 132*b*, respectively, and a corner portion on which the first and second band portions 131*b* and 132*b* meet the first and second connection portions 131*a* and 132*a*, respectively.

That is because, an air gap may be created between the body 110 and the ends E of the first and second band portions 131*b* and 132*b*, and thicknesses of the first and second electrode layers 131 and 132 may be thin on the corner portion C at which the first and second band portions 131*b* and 132*b* meet the first and second connection portions 131*a* and 132*a*, which may become a moisture penetration route.

The opening may be formed in plural, and a total area of the plurality of openings H may occupy 10 to 90% of a total area of the first and second electrode layers.

In the case in which the total area of the plurality of openings is less than 10% of the total area of the first and second electrode layers, it may be difficult to secure electrical connectivity, and in the case in which the total area of the plurality of openings is greater than 90%, moisture resistance reliability may degrade.

Meanwhile, the third inorganic insulating layer 143 may be formed on an overall area of an external surface of the body 110 other than an area in which the first and second electrode layers 131 and 132 are formed. Accordingly, moisture may be prevented from penetrating into the body through the external surface of the body.

The first and second plating layers 151 and 152 may be disposed on the first and second inorganic insulating layers 141 and 142, respectively. The first and second plating layers 151 and 152 may serve to improve mounting properties.

The first and second plating layers 151 and 152 may be an Ni plated layer or an Sn plated layer. The first and second plating layers 151 and 152 may be formed in such a manner that the Ni plated layer and the Sn plated layer are sequentially formed on the first and second plating layers 151 and 152, and may also include a plurality of the Ni plated layers and/or a plurality of the Sn plated layers.

Thicknesses of the first and second plating layers 151 and 152 may not be particularly limited. For example, the thicknesses may be within a range from 3 µm to 10 µm.

There may be no need to particularly limit a size of the ceramic electronic component 100.

However, to simultaneously achieve miniaturization and high capacitance of the ceramic electronic component, the number of layers may need to be increased by configuring thicknesses of a dielectric layer and internal electrodes to be thin. Thus, the improvement of moisture resistance reliability according to the example may be more prominent in the ceramic electronic component having a size of "0402" (0.4 mm×0.2 mm) or less.

Thus, in the case in which a distance between third and fourth surfaces of the body is defined as L, and a distance between fifth and sixth surfaces of the body is defined as W, L may be 0.4 mm or less, and W may be 0.2 mm or less.

In other words, the ceramic electronic component may be implemented as a ceramic electronic component having a size of "0402" (0.4 mm×0.2 mm).

According to the aforementioned exemplary embodiments, a ceramic electronic component in which discontinuation of a plating layer is prevented while improving moisture resistance reliability may be provided by controlling a thickness of an inorganic insulating layer.

While the exemplary embodiments have been shown and described above, it will be apparent to those skilled in the art that modifications and variations could be made without departing from the scope of the present invention as defined by the appended claims.

What is claimed is:

1. A ceramic electronic component, comprising:
a body including a dielectric layer and first and second internal electrodes disposed to oppose each other with the dielectric layer interposed therebetween, first and second surfaces opposing each other, third and fourth surfaces connected to the first and second surfaces and opposing each other, and fifth and sixth surfaces connected to the first to fourth surfaces and opposing each other;
a first external electrode including a first electrode layer disposed on the third surface of the body and electrically connected to the first internal electrode, a first inorganic insulating layer disposed on the first electrode layer, and a first plating layer disposed on the first inorganic insulating layer;
a second external electrode including a second electrode layer disposed on the fourth surface of the body and electrically connected to the second internal electrode, a second inorganic insulating layer disposed on the second electrode layer, and a second plating layer disposed on the second inorganic insulating layer; and
a third inorganic insulating layer disposed on the first, second, fifth, and sixth surfaces of the body and connected to the first and second inorganic insulating layers,
wherein the first, second, and third inorganic insulating layers comprise at least one selected from the group of $SiO_2$, $Al_2O_3$ and $ZrO_2$, and the first, second, and third inorganic insulating layers have a thickness within a range from 20 nm to 150 nm, and
wherein the first and second inorganic insulating layers have an, opening formed therein, and the first and second plating layers are in direct contact with the first and second electrode layers through the opening, respectively.

2. The ceramic electronic component of claim 1, wherein the first electrode layer comprises a first connection portion disposed on the third surface of the body, and a first band portion extended from the first connection portion to portions of the first, second, fifth, and sixth surfaces, and
wherein the second electrode layer comprises a second connection portion disposed on the fourth surface of the body, and a second band portion extended from the second connection portion to portions of the first, second, fifth, and sixth surfaces.

3. The ceramic electronic component of claim 2, wherein the first and second electrode layers cover ends of the first and second band portions, respectively, and a corner portion on which the first and second band portions meet the first and second connection portions, respectively.

4. The ceramic electronic component of claim 1, wherein the opening is formed in plural, and a total area of the plurality of openings occupies 10% to 90% of a total area of the first and second electrode layers.

5. The ceramic electronic component of claim 1, wherein the third inorganic insulating layer is formed on overall areas of an external surface of the body except for areas in which the first and second electrode layers are formed.

6. The ceramic electronic component of claim 1, wherein the dielectric layer has a thickness of 0.4 µm or less, and the first and second internal electrodes have a thickness of 0.4 µm or less.

7. The ceramic electronic component of claim 1, wherein the body comprises a capacitance forming portion forming capacitance including, the first and second internal electrodes disposed to oppose each other with the dielectric layer interposed therebetween, and a cover portion formed in upper and lower portions of the capacitance forming portion, and the cover portion has a thickness of 20 µm or less.

8. The ceramic electronic component of claim 1, wherein L is 0.4 mm or less, and W is 0.2 mm or less, where L is a distance between the third and fourth surfaces, and W is a distance between the fifth and sixth surfaces.

9. The ceramic electronic component of claim 1, wherein the first, second and third inorganic insulating layers have a water vapor transmission rate of 5 mg/(m$^2$*day) or less.

10. The ceramic electronic component of claim 1, wherein the first and second electrode layers comprise a conductive metal and glass.

11. The ceramic electronic component of claim 1, wherein the first and second electrode layers have a thickness within a range from 1 µm to 10 µm.

12. The ceramic electronic component of claim 1, wherein the first and second plating layers comprise an Ni plated layer and an Sn plated layer disposed on the Ni plated layer.

13. The ceramic electronic component of claim 1, wherein the first and second plating layers have a thickness within a range from 3 µm to 10 µm.

14. A ceramic electronic component comprising:

a ceramic body including a dielectric layer;

first and second internal electrodes disposed to face each other with the dielectric layer interposed therebetween in the ceramic body;

first and second external electrodes disposed on external surfaces of the ceramic body and electrically connected to the first and second internal electrodes, respectively, the first and second external electrodes respectively include first and second electrode layers electrically connected to the first and second internal electrodes, respectively, first and second inorganic insulating layers disposed on the first and second electrode layers, respectively, and first and second plating layers disposed on the first and second inorganic insulating layers, respectively; and a third inorganic insulating layer connected to the first and second inorganic insulating layers, wherein the first, second, and third inorganic insulating layers have a thickness within a range from 20 nm to 150 nm, the first and second inorganic insulating layers cover all corner portions of the first and second electrode layers, the first and second inorganic insulating layers extend beyond the first and second electrode layers, respectively, to be in direct contact with the third inorganic insulating layer, and the first and second inorganic insulating layers have an opening formed therein, and the first and second plating layers are in direct contact with the first and second electrode layers through the opening, respectively.

15. The ceramic electronic component of claim 14, wherein the first, second and third inorganic insulating layers comprise at least one selected from the group of SiO$_2$, Al$_2$O$_3$ and ZrO$_2$.

16. The ceramic electronic component of claim 14, wherein the first, second and third inorganic insulating layers have a water vapor transmission rate of 5 mg/(m$^2$*day) or less.

* * * * *